Figure 1:
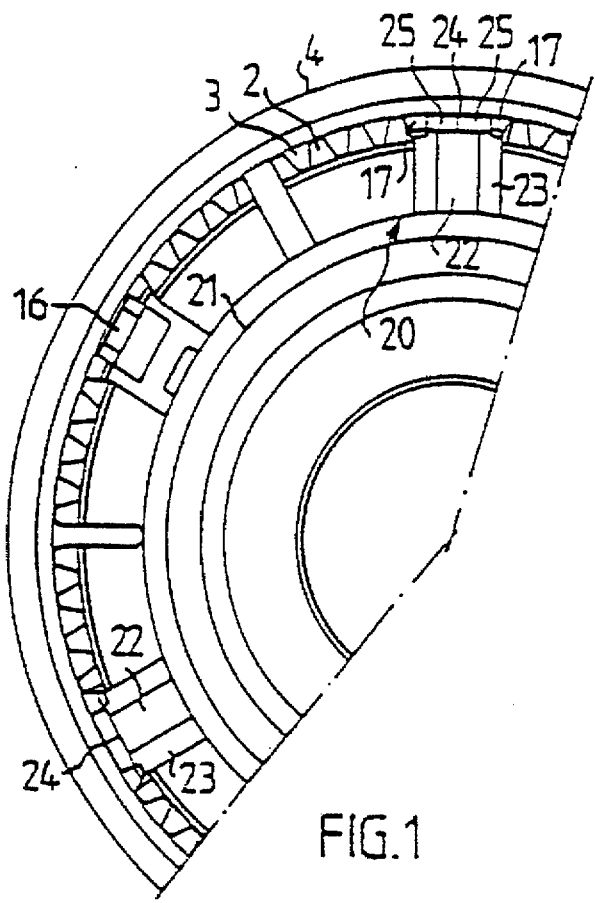

United States Patent [19]

Olsson

[11] Patent Number: 5,678,670
[45] Date of Patent: Oct. 21, 1997

[54] SYNCHRONIZING DEVICE IN A VEHICLE GEARBOX

[75] Inventor: Ronald Olsson, Partille, Sweden

[73] Assignee: Volvo Lastvagnar AB, Gothenburg, Sweden

[21] Appl. No.: 648,180
[22] PCT Filed: Nov. 16, 1994
[86] PCT No.: PCT/SE94/01083
§ 371 Date: Jun. 17, 1996
§ 102(e) Date: Jun. 17, 1996
[87] PCT Pub. No.: WO95/14179
PCT Pub. Date: May 26, 1995

[30] Foreign Application Priority Data

Nov. 18, 1993 [SE] Sweden .................. 9303827

[51] Int. Cl.$^6$ .................................. F16D 23/06
[52] U.S. Cl. ...................... 192/53.32; 192/53.34; 192/53.31; 74/339
[58] Field of Search ............. 192/53.31, 53.32, 192/53.34, 53.341, 53.342, 53.343; 74/339

[56] References Cited

U.S. PATENT DOCUMENTS

| | | |
|---|---|---|
| 3,548,983 | 12/1970 | Hiraiwa . |
| 4,289,223 | 9/1981 | Strehler et al. . |
| 4,732,247 | 3/1988 | Frost ................... 192/53.31 |
| 4,805,755 | 2/1989 | Fukumoto et al. ........... 192/53.32 |
| 5,135,087 | 8/1992 | Frost . |
| 5,544,727 | 8/1996 | Braun ................. 192/53.31 X |

Primary Examiner—Rodney H. Bonck
Attorney, Agent, or Firm—Young & Thompson

[57] ABSTRACT

Synchronizing device in a motor vehicle gearbox, comprising outer and inner synchronizing rings (12, 13) and a torque transmitting element (20) which transmits torque from the inner synchronizing ring to an engagement sleeve (4) in such a manner that the engaging sleeve is imparted extra force in the engagement direction.

8 Claims, 2 Drawing Sheets

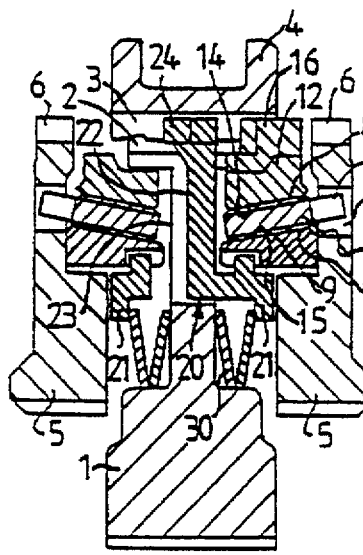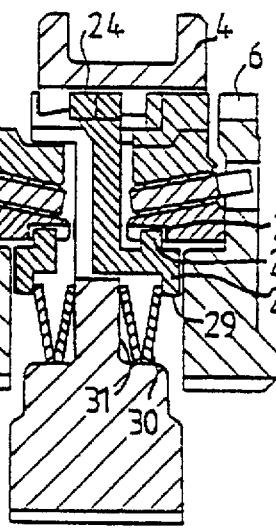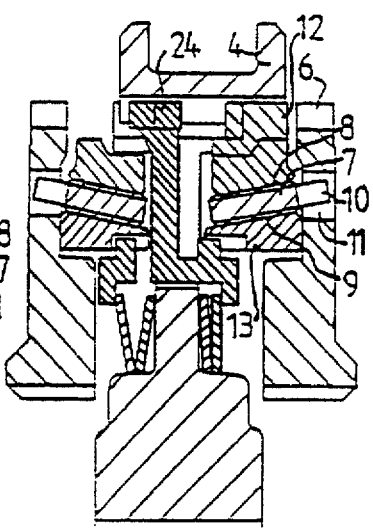
FIG. 2A  FIG. 3A  FIG. 4A
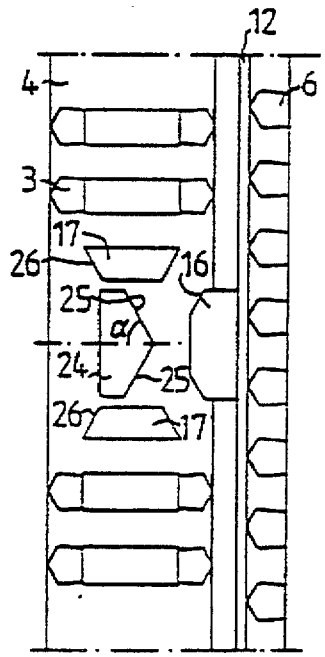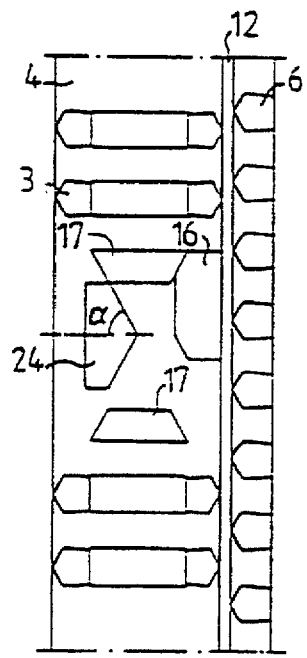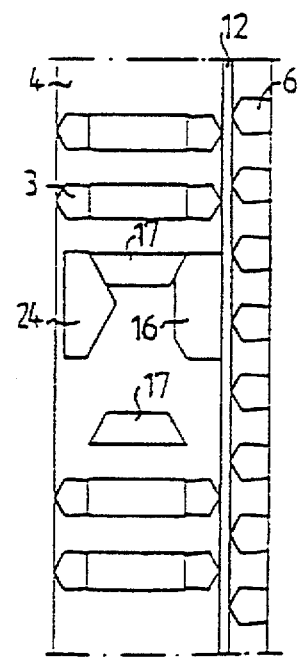
FIG. 2B  FIG. 3B  FIG. 4B

SYNCHRONIZING DEVICE IN A VEHICLE GEARBOX

The present invention relates to a synchronizing device in a vehicle gearbox, comprising a guide sleeve, intended to be non-rotatably joined to a shaft in a gearbox, an engaging sleeve, which is non-rotatably but axially displaceably mounted on the guide sleeve, an engaging ring provided with external engaging teeth, said ring being designed to be non-rotatably joined to a gear rotatably mounted on said shaft and being lockable relative to the guide sleeve by axial displacement of the engaging sleeve from a neutral position to an engaging position, in which internal engaging teeth on the engaging sleeve engage with external teeth on the engaging ring, and with synchronizing means cooperating with the engaging sleeve and the engaging ring, in the form of at least two concentric synchronizing rings, each having an individual conical frictional surface, said synchronizing rings being displaceable in engagement with corresponding conical frictional surfaces on a sleeve element rotationally fixed relative to the engaging ring and lying between said synchronizing rings.

Synchronizing devices of the abovementioned type, so-called double synchronizers, are used i.a. in gearboxes for trucks to increase the synchronizing torque and thus reduce the shifting work and make possible relatively short shifting movements of the shift lever. A double synchronization provides an approximately 30% reduction in the shifting force on the shift lever compared with the corresponding single synchronization. In many cases the shifting force can exceed 200N on the shift lever in a gearbox with single synchronization and this means that even with a double synchronization the shifting force will be high. An additional reduction would therefore be desirable to eliminate the risk of wear-related injuries to the back and shoulders of truck drivers.

One method is to increase the shifting distance in the shift lever to provide a greater mechanical advantage, but this presupposes that space is available so that the driver will not risk hitting his knuckles against parts in the cab. A long shifting distance will also create problems in trucks with the engine and gearbox placed under a tippable cab. Another method is to use a compressed air servo unit, but this is an expensive solution.

The purpose of the present invention is to achieve a double synchronization of the type described by way of introduction, by means of which it is possible, while retaining a short shifting distance of the shift lever, to reduce, without a servo unit, the shifting force which must be applied to the shift lever, to a fraction of what is required for shifting in previously known gearboxes with double synchronization of the type described.

This is achieved according to the invention by virtue of the fact that that one synchronizing ring is fixed rotationally relative to the torque transmitting element which has cam surfaces cooperating with cam surfaces on the engaging sleeve, said cam surfaces, upon relative rotation between the torque transmitting element and the engaging sleeve,—caused by frictional engagement between the frictional surfaces of the synchronizing means—creates a force acting in the engaging direction of the engaging sleeve.

The invention is based on the idea of transferring a portion of the rotational energy of the gearbox itself to the shifting mechanism and in this manner creating a type of integrated servo system, which assists in the manually initiated and terminated shifting sequence. In principle, shifting, after manual initiation of the synchronizing sequence, can be effected entirely under the influence of the created servo system. However, in many cases it can be undesirable, since it can result in involuntary shifting.

In a further development of the synchronizing device according to the invention, the torque transmitting element is axially displaceably joined to said synchronizing ring and is moveable away from the synchronizing ring against the effect of the spring force, which in a preferred embodiment is created by a cup spring package between a surface on the torque transmitting element and an opposing surface on the guide sleeve. Thus the force of the compressed spring package together with the angle of the cam surfaces determine the force acting on the engaging sleeve in the engaging direction, which force can be selected so that it is not quite sufficient to complete the shifting, but is sufficient so that the additional manual force required only prevents unintentional shifting.

Figure 5:
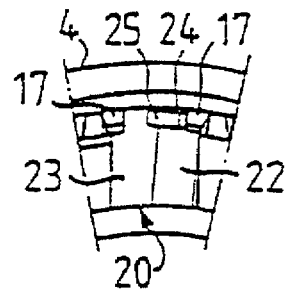
Figure 6:
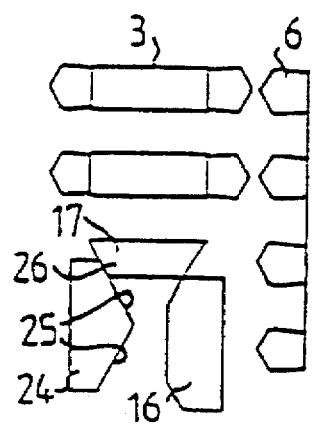
Figure 7:
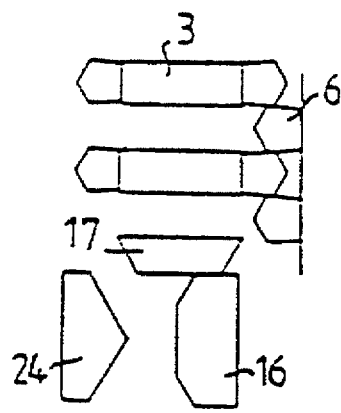

The invention will be described in more detail below with reference to examples shown in the accompanying drawings, where FIG. 1 shows a partial end view of a synchronizing device according to the invention, FIGS. 2a and 2b show a longitudinal section and a plan view of the device in FIG. 1 with the components in the neutral position, FIGS. 3a and 3b show corresponding views to FIGS. 2a and 2b with the components shown in the blocking phase, FIGS. 4a and 4b show views corresponding to FIGS. 2a and 2b with the components in the synchronizing phase, FIG. 5 is a partial end view of the components during the synchronizing phase and FIGS. 6 and 7 show the components during the release and engaging phases, respectively.

The synchronizing device according to the invention is based on a previously known so-called double synchronizer, which comprises a guide sleeve 1, non-rotabably fixed on a shaft (not shown) in a gearbox, said guide sleeve having external teeth 2 engaging in a gap between the interior teeth 3 of an engaging sleeve 4. An engaging ring 5 with external engaging teeth 6 is solidly joined to a gear (not shown) rotatably mounted on a shaft. A synchronizing cone 7 has an external and an internal conical frictional surface 8 and 9, respectively, and is provided with pins 10 extending into openings 11 in the engaging ring 5, whereby the synchronizing cone 7 is rotationally fixed but axially limitedly moveable relative to the engaging ring 5. Outer and inner synchronizing rings 12 and 13, respectively, are arranged on either side of the synchronizing cone 7 and are provided with frictional surfaces 14 and 15, respectively, which face the frictional surfaces 8 and 9, respectively, of the synchronizing cone 7. In the embodiment shown, the outer synchronizing ring 12 is provided with keys 16, which in a known manner cooperate with a pair of ramps 17 on the engaging sleeve 4. In addition to the components described the double synchronization also comprises known spring-loaded keys (not shown).

According to the invention the torque of the inner synchronizing ring 13 is transmitted to the engaging sleeve 4 via a torque transmitting element, generally designated 20, which comprises a ring 21 with a number, for example three, of arms or fingers 22, which are held in slots 23 in the guide sleeve 1 and at their ends have keys 24 which have cam surfaces 25 oriented in a V-shape and which cooperate with corresponding cam surfaces 26 on the ramps 17. In the example shown, the cam surfaces 25, 26 have an angle α of 60° to the axial direction, but the angle can vary within the interval 40°–75°.

The ring 21 is made with a number of evenly distributed teeth 27, which engage grooves 28 in the inner synchronizing ring 13. The ring has a radial flange 29 and a cup spring package consisting of two cup springs 30 lying between the flange 29 and an opposite surface 31 on the guide sleeve 1.

The synchronizing device according to the invention functions as follows:

The components are shown in FIGS. 2a and 2b in their neutral position. When a gear is engaged, which involves locking the gear (not shown) joined to the engaging ring 5 to the right in the Figures, the engaging sleeve 4 is displaced to the right. The outer synchronizing ring 12 is thus displaced under the influence of the keys (not shown) to the right and its frictional surface 14 will come into frictional engagement with the frictional surface 8, which will result in the synchronizing cone 7 being displaced a short distance to the right so that the inner frictional surface 9 of the synchronizing cone 7 will be pressed into engagement with the frictional surface of the inner synchronizing ring 13. The result will be that the synchronizing ring 13 will be rotated and with it the torque transmitting element 20 (see FIGS. 3a, 3b) so that initially the cam surfaces 25 of the keys 24 will come into contact with the cam surfaces 26 of the ramps 17 (FIGS. 3a, 3b). The torque transmitting element 20 will be successively rotated relative to the engaging sleeve 4, and the cooperating cam surfaces 25, 26 will cause the torque transmitting element 20 to be pressed back, compressing the cup springs 30 and the components will assume the position shown in FIGS. 4a, 4b. The springs 30 can be dimensioned so that in their compressed state they will exert a force of approximately 1500N in the engagement direction.

After completed synchronization according to FIGS. 4a, 4b, release and engagement is effected as is illustrated in FIGS. 6 and 7, under the influence of the force from the spring package 30, which, in combination with the angle of the cam surfaces, determines how much force the driver must exert on the lever to complete the shifting sequence.

During the above described sequence, the synchronization itself takes place in a conventional manner by the ramp 17 cam surfaces 26 proximate the synchronizing rings 12 coming into contact with corresponding cam surfaces on the blocking keys 16 of the outer synchronizing ring.

An angle α of 60° for the cam surfaces and a spring package with a force in the axial direction of circa 1500N has been shown for a certain gearbox to reduce the force and the gear lever to about 25% of the force supplied without the described synchronizing device according to the invention.

The invention has been described with reference to components on the right side of the guide sleeve 1. Of course a corresponding function is obtained when shifting involving locking of the engaging ring 5 to the left of the guide sleeve 1. The ring 21 of the lefthand torque transmitting element has fingers (not shown) which are angularly displaced relative to the fingers 22 on the righthand element 20.

I claim:

1. Synchronizing device in a vehicle gearbox comprising a guide sleeve, intended to be non-rotatably joined to a shaft in a gearbox, an engaging sleeve (4), which is non-rotatably but axially displaceably mounted on the guide sleeve, an engaging ring provided with external engaging teeth, said ring being designed to be non-rotatably joined to a gear rotatably mounted on said shaft and being lockable relative to the guide sleeve by axial displacement of the engaging sleeve from a neutral position to an engaging position, in which internal engaging teeth on the engaging sleeve engage with external teeth on the engaging ring, and with synchronizing means cooperating with the engaging sleeve and the engaging ring, in the form of at least two concentric synchronizing rings, each having an individual conical frictional surface, said synchronizing rings being displaceable in engagement with corresponding conical frictional surfaces on a sleeve element rotationally fixed relative to the engaging ring and lying between said synchronizing rings, characterized in that one synchronizing ring (13) is fixed rotationally relative to a torque transmitting element (20) which has cam surfaces (25) cooperating with cam surfaces (26) on the engaging sleeve (4), said cam surfaces, upon relative rotation between the torque transmitting element (20) and the engaging sleeve (4),—caused by frictional engagement between the frictional surfaces (8,9,14,15) of the synchronizing means (7,12,13)—creates a force acting in the engaging direction of the engaging sleeve.

2. Device according to claim 1, characterized in that the torque transmitting element (20) is axially displaceably joined to said synchronizing ring (13) and is moveable away from the synchronizing ring against the effect of a spring force.

3. Device according to claim 2, characterized in that the synchronizing means have an outer and an inner synchronizing ring (12, 13) which are concentric and of which the inner ring is joined to the torque transmitting element (20).

4. Device according to claim 1, characterized in that the synchronizing means have an outer and an inner synchronizing ring (12,13) which are concentric and of which the inner ring is joined to the torque transmitting element (20).

5. Device according to claim 4, characterized in that the torque transmitting element (20) comprises a sleeve (21) with external engaging teeth (27) which are engaged in grooves (28) in the inner synchronizing ring (13), that radial fingers (22) joined to said sleeve are received in slots (23) in the guide sleeve (21) and that said cam surfaces (25) are formed at the outer end of the fingers.

6. Device according to claim 5, characterized in that each finger (22) at its outer end has a key (24) which is provided with a pair of cam surfaces (24) disposed in a V-shape and facing the synchronizing rings (12,13), and that the engagement sleeve (4) has for each key a pair of cam elements (17), which, in the neutral position, lie on either side of the associated key and has, for each opposite cam surface (25) on the key, a complementary cam surface (26).

7. Device according to claim 5, characterized in that compression springs in the form of cup springs (30) are arranged between an abutment surface on the sleeve of the torque transmitting element (20) and an associated surface on the guide sleeve (1).

8. Device according to claim 6, characterized in that compression springs in the form of cup springs (30) are arranged between an abutment surface on the sleeve of the torque transmitting element (20) and an associated surface on the guide sleeve (1).

* * * * *